(12) United States Patent
Yoshikawa et al.

(10) Patent No.: US 7,562,582 B2
(45) Date of Patent: Jul. 21, 2009

(54) SEMICONDUCTOR STRAIN SENSOR

(75) Inventors: Eiji Yoshikawa, Chiyoda-ku (JP);
Masaaki Taruya, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/785,486

(22) Filed: Apr. 18, 2007

(65) Prior Publication Data
US 2008/0094167 A1  Apr. 24, 2008

(30) Foreign Application Priority Data
Oct. 20, 2006   (JP)   ............................. 2006-285987

(51) Int. Cl.
*G01B 7/16* (2006.01)
(52) U.S. Cl. ....................................... 73/777
(58) Field of Classification Search ............ 73/777; 257/417, 419
See application file for complete search history.

(56) References Cited

U.S. PATENT DOCUMENTS

| 4,480,488 | A | * | 11/1984 | Read et al. | 73/862.68 |
| 4,771,638 | A | * | 9/1988 | Sugiyama et al. | 73/721 |
| 4,838,088 | A | * | 6/1989 | Murakami | 73/724 |
| 5,510,276 | A | * | 4/1996 | Diem et al. | 438/53 |
| 5,912,499 | A | * | 6/1999 | Diem et al. | 257/419 |
| 6,058,781 | A | * | 5/2000 | Kusuyama et al. | 73/724 |
| 6,184,561 | B1 | * | 2/2001 | Tanaka et al. | 257/417 |
| 6,521,965 | B1 | * | 2/2003 | Lutz | 257/415 |

FOREIGN PATENT DOCUMENTS

| JP | 06-102118 A | 4/1994 |
| JP | 07103837 A | 4/1995 |
| JP | 2000-340805 A | 12/2000 |
| JP | 2001-004470 A | 1/2001 |
| JP | 2002-090244 A | 3/2002 |
| JP | 2002122497 A | 4/2002 |
| JP | 2002-131161 A | 5/2002 |
| JP | 2006003099 A | 1/2006 |

\* cited by examiner

*Primary Examiner*—Lisa M Caputo
*Assistant Examiner*—Octavia Davis
(74) *Attorney, Agent, or Firm*—Sughrue Mion, PLLC

(57) ABSTRACT

An SOI substrate includes a thin diaphragm portion that is formed by removing a portion of the substrate from a rear surface side, and a thick outer frame portion that surrounds the diaphragm portion. A piezoresistive element that outputs an electrical signal in response to pressure is formed on the diaphragm portion, and an electrode that extracts the electrical signal from the piezoresistive element is formed on the outer frame portion. The electrode is disposed at a position on the outer frame portion that is separated by greater than or equal to 100 μm from a boundary line between the diaphragm portion and the outer frame portion.

3 Claims, 2 Drawing Sheets

SEMICONDUCTOR STRAIN SENSOR

BACKGROUND OF THE INVENTION

1. Field of the Invention

The present invention relates to a semiconductor strain sensor that includes a piezoresistive element and an electrode for externally extracting a signal from the piezoresistive element on a silicon-on-insulator (SOI) substrate.

2. Description of the Related Art

Conventional semiconductor strain sensors include: a semiconductor substrate such as single-crystalline silicon, etc., in which are formed: a thin diaphragm portion; and a thick outer frame portion that is positioned around the diaphragm portion; and a glass pedestal that is joined to the outer frame portion of the semiconductor substrate (see Patent Literature 1, for example). A plurality of strain gauge resistors in which resistance changes due to piezoresistance effects when pressure is applied are disposed on the diaphragm portion so as to constitute a bridge circuit, and pressure is detected by detecting changes in the resistance of the strain gauge resistors as changes in voltage. Electrodes that are made of aluminum, etc., are connected to the strain gauge resistors by wiring so as to output pressure signals externally.

[Patent Literature 1] Japanese Patent Laid-Open No. 2002-131161 (Gazette)

In conventional semiconductor strain sensors, aluminum is used in the electrodes, and single-crystalline silicon is used in the semiconductor substrate. The thermal expansion coefficient of aluminum is approximately 23.5 ppm/° C., and the thermal expansion coefficient of single-crystalline silicon is approximately 2.5 ppm/° C. Thus, because the thermal expansion coefficients of the electrodes and the semiconductor substrate differ greatly, one problem has been that the electrodes and the semiconductor substrate may warp if the ambient temperature at which the sensor is used changes, generating thermal stresses and giving rise to temperature drift, or thermal hysteresis, etc., in the output signals from the sensor.

SUMMARY OF THE INVENTION

The present invention aims to solve the above problems and an object of the present invention is to provide a semiconductor strain sensor that has superior temperature stability by separating a region of formation of an electrode from a diaphragm portion on which a piezoresistive element is formed to make the piezoresistive element less likely to be affected by thermal stresses from the electrode.

In order to achieve the above object, according to one aspect of the present invention, there is provided a semiconductor strain sensor including: a silicon-on-insulator (SOI) substrate that includes: a thin diaphragm portion that is formed by removing a portion of the substrate from a rear surface side; and a thick outer frame portion that surrounds the diaphragm portion; a piezoresistive element that is formed on the diaphragm portion, and that outputs an electrical signal in response to pressure; and an electrode that is formed on the outer frame portion, and that extracts the electrical signal from the piezoresistive element. The electrode is disposed at a position that is separated by greater than or equal to 100 nm from a boundary between the diaphragm portion and the outer frame portion.

According to the present invention, because the electrode is disposed at a position on the outer frame portion that is separated by greater than or equal to 100 μm from the boundary between the diaphragm portion and the outer frame portion, the piezoresistive element is less likely to be affected by thermal stresses from the electrode, suppressing thermal hysteresis of the output voltage to less than or equal to 0.2 percent FS per sensor chip unit. Thus, 1 percent FS or less, which is demanded of control systems, can be met even after the semiconductor strain sensor has been assembled for on-board installation.

DETAILED DESCRIPTION OF THE PREFERRED EMBODIMENTS

Embodiment 1

Figure 1:
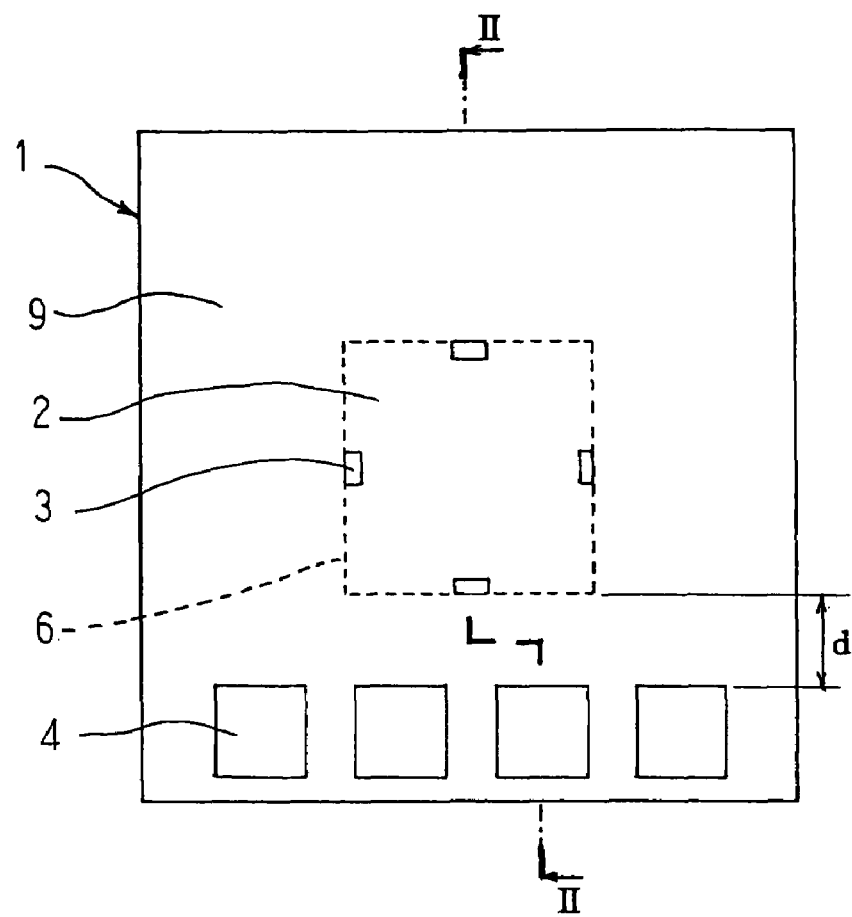
FIG. 1 is a plan that schematically shows a configuration of a semiconductor strain sensor according to Embodiment 1 of the present invention.
Figure 2:
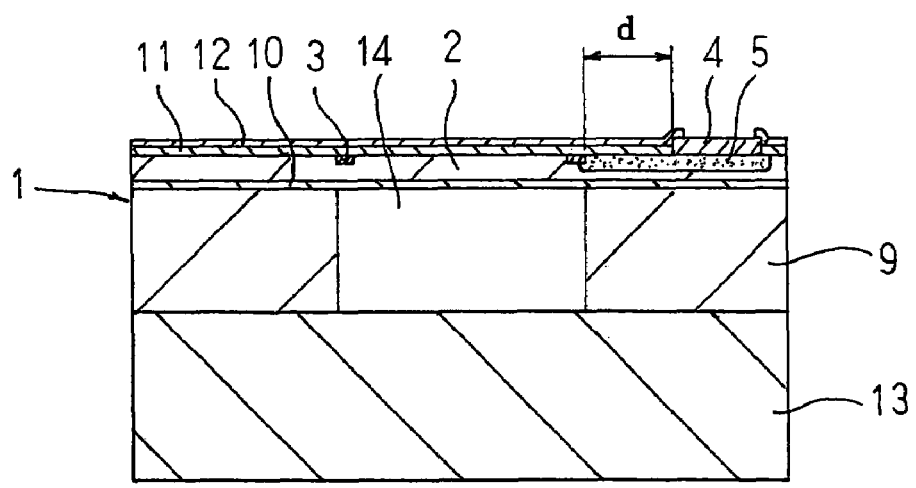
FIG. 2 is a cross section that is taken along line II-II in FIG. 1 so as to be viewed from the direction of the arrows.

FIG. 1 is a plan that schematically shows a configuration of a semiconductor strain sensor according to Embodiment 1 of the present invention, and FIG. 2 is a cross section that is taken along line II-II in FIG. 1 so as to be viewed from the direction of the arrows. A semiconductor strain sensor according to Embodiment 1 is assumed to be for measuring intake air pressure inside an intake manifold of a vehicle engine, and to have a pressure range that is up to approximately 5 atmospheres.

In FIGS. 1 and 2, an SOI substrate 1 is prepared, for example, by fixing together two silicon substrates by means of an embedded oxide film 10, and polishing the silicon substrate on a front surface to a desired thickness. The SOI substrate 1 includes: a thin, pressure-detecting diaphragm portion 2; and a thick outer frame portion 9 that is formed around the diaphragm portion 2. The diaphragm portion 2 is formed by applying deep reactive ion etching (DRIE) from a rear surface of the SOI substrate 1 to remove the silicon substrate from the rear surface. Here, the size of the diaphragm portion 2 depends on the pressure range that is to be detected and cannot be defined unconditionally, but if used in a strain sensor that measures pressure from a vacuum up to 1 atmosphere, for example, then the diaphragm portion will be a square that has 400 μm to a side and a thickness of 10 μm.

A plurality of piezoresistive elements 3 for outputting detection signals that are based on changes in resistance accompanying distortion of the diaphragm portion 2 are formed by ion implantation and diffusion on the silicon substrate on the front surface that constitutes the diaphragm portion 2. The plurality of piezoresistive elements 3 are electrically connected by wiring 5 that is similarly formed by ion implantation and diffusion so as to constitute a Wheatstone bridge. The wiring 5 is extended onto the outer frame portion 9, and electrodes 4 are formed on extended ends of the wiring 5. Thus, voltage is supplied from outside and detection signals are extracted from the piezoresistive elements 3 by means of the electrodes 4 that are connected by the wiring 5. Here, the electrodes 4 are metal films that are formed by sputtering, etc., and if general consideration is given to ohmic contact with the wiring 5, cost, durability, etc., it is preferable to use aluminum, or an aluminium alloy in which a trace quantity of silicon, copper, etc., has been added to aluminum, as an electrode material.

Electrical insulation of each of the elements is ensured by forming an interlayer insulating film 11 that is constituted by a silicon oxide film on the front surface side of the SOI substrate 1, for example. In addition, the semiconductor strain sensor is protected by laminating a protective film 12 that is constituted by a silicon nitride film onto the interlayer insulating film 11, for example. A rear surface of the outer frame portion 9 of the SOI substrate 1 is joined to the glass pedestal 13 by anodic bonding, etc. The cavity that was formed by etching is sealed airtightly by the glass pedestal 13 to constitute a pressure reference chamber 14. The pressure reference chamber 14 is maintained in a vacuum, for example.

In a semiconductor strain sensor that is configured in this manner, a constant direct-current voltage is applied across input terminals of the Wheatstone bridge by means of the electrodes 4, and if there is distortion in the diaphragm portion 2, it gives rise to changes in resistance in the piezoresistive elements 3 and is detected as a change in voltage.

In this kind of semiconductor strain sensor, because distortion of the diaphragm portion 2 is detected using piezoresistance effects, any distortions that arise in the piezoresistive elements 3 due to factors other than the applied pressure that should be measured constitute error factors in the sensor characteristics.

Figure 3:
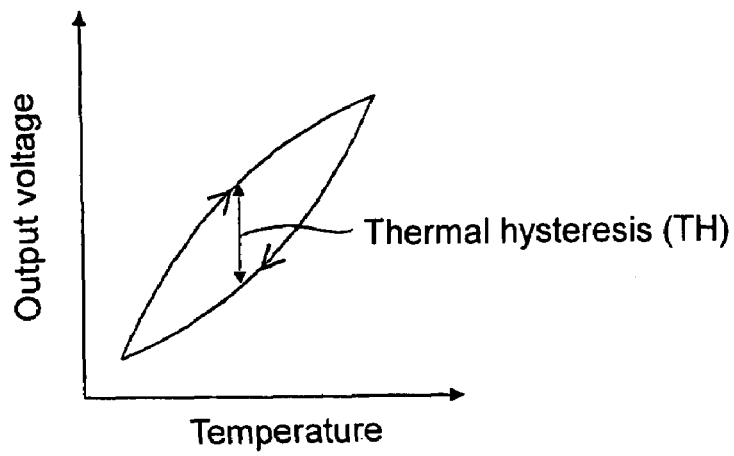
FIG. 3 is a graph that shows a definition of thermal hysteresis in a semiconductor strain sensor.

Thermal hysteresis (TH) is generally present in output signals from a semiconductor strain sensor, as shown in FIG. 3. Moreover, the temperature range may be −40 degrees Celsius to 120 degrees Celsius, for example.

Figure 4:
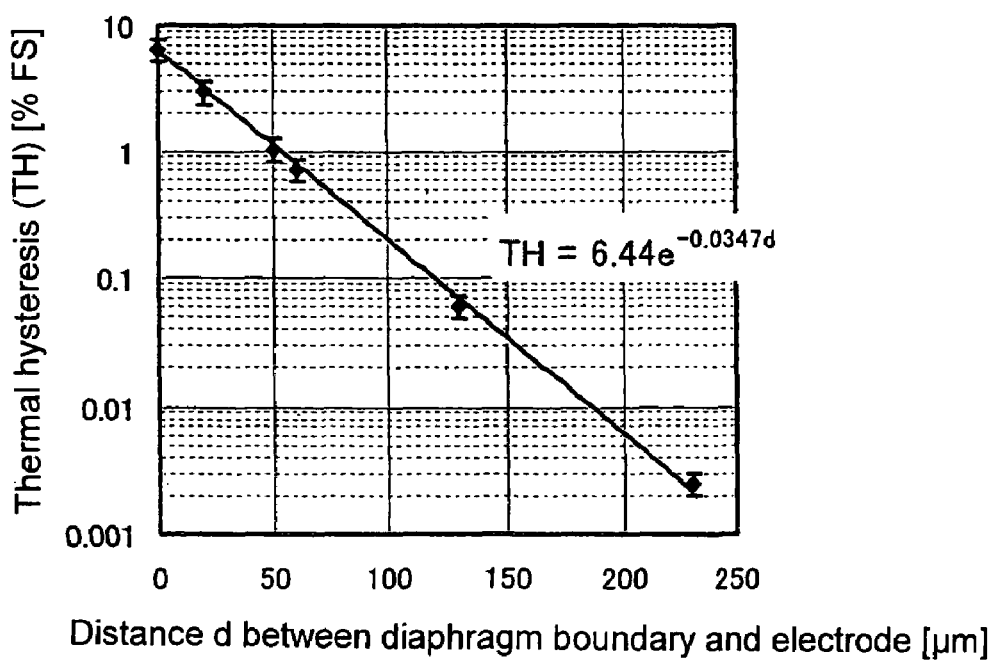
FIG. 4 is a graph that shows a relationship between distance between a diaphragm boundary and an electrode and thermal hysteresis in the semiconductor strain sensor according to Embodiment 1 of the present invention.

Next, results when sensor chips in which a distance d between a boundary between the diaphragm portion 2 and the outer frame portion 9 (boundary line 6) and the electrodes 4 was changed were prepared and thermal hysteresis of each of the sensor chips was measured are shown in FIG. 4. Moreover, in each of the sensor chips, side length and thickness of the diaphragm portions, which had a horizontal shape that was square, were 400 μm and 10 μm, respectively, and longitudinal length of the piezoresistive elements was 35 μm. The vertical axis in FIG. 4 represents the percentage of the measured values of thermal hysteresis relative to overall output (FS).

From FIG. 4, it can be seen that thermal hysteresis decreases exponentially as the distance d is increased. In other words, it can be seen that the closer the electrodes 4 are to the diaphragm portion 2, the greater the thermal stress errors in output that result from thermal stresses in the electrodes 4.

It can also be seen that thermal hysteresis is less than or equal to 0.2 percent FS when the distance d is greater than or equal to 100 μm.

According to Embodiment 1, because the electrodes 4 are formed on the outer frame portion 9 so as to be separated from the boundary line 6 between the diaphragm portion 2 and the outer frame portion 9, the piezoresistive elements 3 are less likely to be affected by the thermal stresses from the electrodes 4, enabling thermal stress errors to be reduced, and also enabling temperature stability to be improved.

Because the electrodes 4 are disposed at positions on the outer frame portion 9 that are separated by greater than or equal to 100 μm toward the outer frame portion 9 from the boundary line 6, thermal hysteresis of the output voltage can be suppressed to less than or equal to 0.2 percent FS per sensor chip unit. Thus, 1 percent FS or less, which is demanded of control systems, can be met even after the semiconductor strain sensor has been assembled for on-board installation, enabling a semiconductor strain sensor to be achieved that can be used in applications that measure intake air pressure inside an intake manifold of a vehicle engine.

Because the SOI substrate 1 is etched using DRIE, wall surfaces of the cavity that are obtained by etching can be formed so as to be perpendicular to the rear surface of the SOI substrate 1. Thus, sensor chip size can be further reduced.

In addition, because the SOI substrate 1 is used, etching is stopped by the embedded oxide film 10 and will not progress any further. Thus, the processing precision of the thickness of the diaphragm portion 2 can be increased.

Moreover, in Embodiment 1, the wiring 5 is formed by ion implantation and diffusion, but a portion of the wiring 5 may also be formed by a metal film similar to that of the electrodes 4. In that case, the metal film that is formed on that portion of the wiring 5 will also be formed so as to be separated by greater than or equal to 100 μm toward the outer frame portion from the boundary line 6 between the diaphragm portion 2 and the outer frame portion 9.

Embodiment 2

In Embodiment 2, electrodes 4 are disposed at positions on an outer frame portion 9 that are separated by greater than or equal to 120 μm toward the outer frame portion 9 from a boundary line between a diaphragm portion 2 and the outer frame portion 9.

Moreover, the rest of this embodiment is configured in a similar manner to Embodiment 1 above.

In semiconductor strain sensor manufacturing processes, there may be deviations in the processing precision of the diaphragm portion 2 and the electrodes 4. Positions at the boundary line 6 between the diaphragm portion 2 and the outer frame portion 9 in particular deviate easily since the diaphragm portion 2 is formed by etching from the rear surface of the SOI substrate 1 using DRIE.

Thus, if a lower limit of the distance d between the boundary line 6 between the diaphragm portion 2 and the outer frame portion 9 and the electrodes 4 is set to 100 μm, there is a risk that sensor chips in which the distance d is less than 100 μm will be produced at a constant ratio during mass production due to such deviations in processing precision. Thus, there is a risk that sensor chips in which thermal stress error per sensor chip unit is not within tolerance limits may be produced, reducing yield.

In Embodiment 2, the lower limit of the distance d between the boundary line 6 between the diaphragm portion 2 and the outer frame portion 9 and the electrodes 4 is set to 120 μm to allow for 5σ (=20 μm) relative to this processing deviation σ. Thus, the distance d between the boundary line 6 between the diaphragm portion 2 and the outer frame portion 9 and the electrodes 4 will be less than 100 μm even if there is a processing deviation, suppressing the likelihood that sensor chips that have thermal stress errors in excess of 0.2 percent FS will be produced, thereby enabling yield to be improved.

Embodiment 3

In Embodiment 3, thickness of a diaphragm portion 2 is stipulated as less than or equal to 30 μm.

Moreover, the rest of this embodiment is configured in a similar manner to Embodiment 1 above.

According to Embodiment 3, because the thickness of the diaphragm portion 2 is stipulated to be less than or equal to 30 μm, the effects of thermal stresses from the electrodes 4 on the piezoresistive elements 3 can be reduced, enabling thermal hysteresis of the output voltage per sensor chip unit to be reliably suppressed to less than or equal to 0.2 percent FS.

Here, considering sensor characteristics, it is desirable for the thickness of the diaphragm portion 2 to be set to greater than or equal to 1 μm.

Moreover, in each of the above embodiments, the semiconductor strain sensor is explained as being used in a pressure sensor, but the semiconductor strain sensor is not limited to pressure sensors and may also be used in other physical quantity sensors such as acceleration sensors, for example, provided that a piezoresistive element is formed on a diaphragm portion.

In each of the above embodiments, the SOI substrate 1 is explained as being prepared by joining two silicon substrates by means of an embedded oxide film, but the SOI substrate is not limited to this provided that a silicon layer is formed on an insulator layer, and silicon-on-sapphire (SOS), separation by implanted oxygen (SIMOX), internal thermal oxidation (ITOX), etc., may also be used, for example.

In each of the above embodiments, no maximum value for the distance d between the electrodes 4 and the boundary line 6 has been described, but the maximum value for the distance d will naturally be determined by acceptable external dimensions for the SOI substrate.

In each of the above embodiments, the horizontal shape of the diaphragm portion 2 is assumed to be a square, but the horizontal shape of the diaphragm portion is not limited to being a square and may also be a polygon such as a hexagon, an octagon, etc., a circle, or an ellipse, for example.

What is claimed is:

1. A semiconductor strain sensor comprising:
    a silicon-on-insulator (SOI) substrate comprising:
        a thin diaphragm portion that is formed by removing a portion of said substrate from a rear surface side; and
        a thick outer frame portion that surrounds said diaphragm portion;
    a piezoresistive element that is formed on said diaphragm portion, and that outputs an electrical signal in response to pressure; and
    an electrode that is formed on said outer frame portion, and that extracts said electrical signal from said piezoresistive element,
    wherein said electrode is disposed at a position that is separated by greater than or equal to 100 μm from a boundary between said diaphragm portion and said outer frame portion.

2. A semiconductor strain sensor according to claim 1, wherein said electrode is disposed at a position that is separated by greater than or equal to 120 μm from said boundary between said diaphragm portion and said outer frame portion.

3. A semiconductor strain sensor according to claim 1, wherein a thickness of said diaphragm portion is less than or equal to 30 μm.

* * * * *